United States Patent [19]
Deakin

[11] 4,075,909
[45] Feb. 28, 1978

[54] AUTOMATIC SHAFT BALANCER

[76] Inventor: James E. Deakin, 52511 Belle Vernon, Rochester, Mich. 48063

[21] Appl. No.: 653,494

[22] Filed: Jan. 29, 1976

[51] Int. Cl.$^2$ ............................................. F16F 15/32
[52] U.S. Cl. .................................. 74/573 R; 74/574; 64/1 V
[58] Field of Search .............. 74/573, 574; 301/5 BA, 301/5 B; 188/1 B; 64/1 V

[56] References Cited
U.S. PATENT DOCUMENTS

| | | | |
|---|---|---|---|
| 3,109,321 | 11/1963 | Rogers | 301/5 BA |
| 3,282,127 | 11/1966 | Deakin | 74/573 |
| 3,410,154 | 11/1968 | Deakin | 301/5 BA |

Primary Examiner—Benjamin W. Wyche
Assistant Examiner—R. C. Turner
Attorney, Agent, or Firm—Gifford, Chandler, Sheridan & Sprinkle

[57] ABSTRACT

A shaft balancer is provided for automatically correcting an unbalanced condition in a rotating shaft and thereafter maintaining the rotating shaft in a balanced condition. The shaft balancer comprises a housing having an outer rim and means for securing the housing to the shaft so that the rim is concentric with the axis of rotation of the shaft. An annulus, constructed of a flexible material, is positioned within the housing and includes a base and an outer slotted rim. The base of the annulus is secured to the housing so that the slotted rim is concentric with the shaft. In addition the slotted rim is spaced radially inward from the housing rim thus forming an annular raceway adapted to receive a plurality of ball members for rotation therein. A floating inertia ring is secured concentrically across the open end of the annulus slotted rim and is radially movable within the housing. Thus with the ring in a neutral or radially extended position, the inertia ring flexes the slotted rim to retain the ball members at their circumferential location while, conversely, with the ring in a radially retracted position, the inertia ring retracts the slotted rim and permits the ball members to move circumferentially around the raceway.

6 Claims, 5 Drawing Figures

AUTOMATIC SHAFT BALANCER

BACKGROUND OF THE INVENTION

I. Field of the Invention

The present invention relates generally to balancers and, more particularly, to an automatic balancer for a rotating body.

II. Description of the Prior Art

There have been several previously known automatic balancers for rotating bodies, such as a rotating shaft. Two such devices are disclosed and described by A. Deakin in his U.S. Pat. Nos. 3,282,127 and 3,410,154. These previously known Deakin shaft balancers briefly comprise a housing having an outer rim and an inwardly spaced cage which floats within the housing. A number of ball members are disposed in the annular channel formed between the cage and the housing rim which assume a circumferential position around the channel necessary to correct an imbalance of the rotating body. The cage, or fingers as they are also known in the trade, are freely floatable within the housing and this permits the ball members to move around the annular channel to a circumferential position necessary to correct an unbalanced condition.

With the free floating cage of the previously known Deakin balancers, it has been found that the cage is subject to shift at high rotation speeds. An unbalanced condition results when the cage shifts so that the operational stability speed of the Deakin balancers is limited. A still further disadvantage of the floating cage construction shown by the previously known Deakin balancers is that after prolonged rotation, even at low rotational speeds, the balancer undergoes brief periods of instability from the shifting cage. Although the previously known Deakin balancers immediately correct for the momentary unbalance of the rotating shaft, elimination of this momentary and periodic instability of the balancer would be highly desirable.

Another previously known shaft balancer is disclosed by Rogers in his U.S. Letters Pat. No. 3,109,321. The Rogers patent discloses a shaft balancer in which ball members assume a circumferential position around a housing necessary to correct the unbalanced condition. The Rogers balancers utilize radially movable finger elements and an elastromeric retainer band. A primary disadvantage of the Rogers balancer is that the elastomeric retainer band tends to deteriorate after a period of prolonged use. While replacement of the elastomeric retainer band is relatively inexpensive, such replacement is nevertheless time consuming and cumbersome and therefore expensive and undesirable. A still further disadvantage of the Rogers balancer is that at high rotational speeds, the elastomeric retainer band tends to liquify, thus rendering the shaft balancer inoperable and creating an imbalanced condition which necessitates replacement of the balancer and possibly replacement of the unit being balanced.

SUMMARY OF THE PRESENT INVENTION

The shaft balancer of the present invention obviates the above-mentioned disadvantages of the previously known shaft balancers by providing a cage constructed of a non-deteriorating material, such as nylon, and which is fixed along one edge to the shaft balancer housing to prevent shifting of the cage relative to the housing.

In brief, the shaft balancer of the present invention comprises a housing having an outer rim and means for securing the housing to the shaft so that the rim is concentric with the axis of rotation of the shaft. An annulus having a base and an outer slotted rim is positioned around the shaft and within the housing. The annulus base is firmly secured to the housing so that the slotted rim is concentric with and spaced radially inward from the housing outer rim thus forming an annular raceway between the slotted rim and the housing rim. A floating inertia ring is secured across the open annular edge of the slotted rim and is adapted to flex the slotted rim radially inward or outward in dependence upon the position of the ring.

A plurality of ball members are placed in the raceway and the ball members are of such a diameter that with the inertia ring in a central or in a radially extended position, the ball members are locked in and prevented from circumferential movement along the raceway, while conversely, with the inertia ring in a radial retracted position, the ball members are free to move circumferentially around the raceway.

As will become hereinafter more clearly apparent, the balancer of the present invention overcomes the disadvantages of the previously known balancers by providing an annulus constructed of a non-deteriorating material. Consequently, periodic maintenance of the balancer as required by the previously known balancers, is rendered unnecessary. Moreover, by securing the base of the annulus against movement relative to the housing, the balancer of the present invention effectively corrects an unbalanced condition in a rotating shaft at rotational speeds in excess of 10,000 rpm. In addition, the securement of the annulus base to the housing eliminates the momentary periods of instability known to the previously known balancers.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

Detailed Description of the Present Invention

Figure 1:
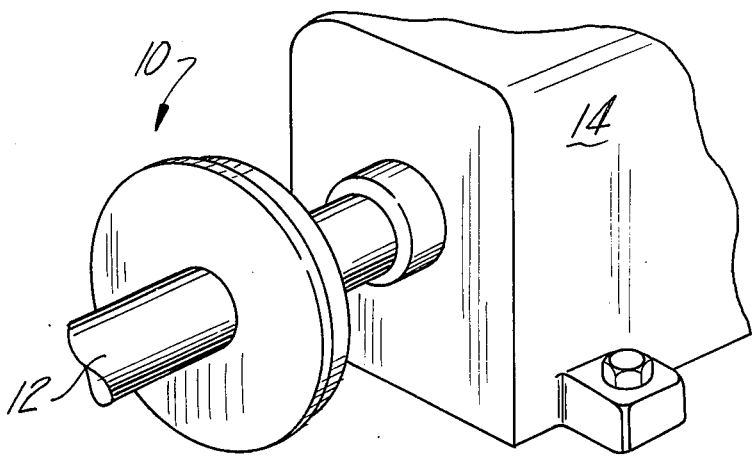
FIG. 1 is a perspective view showing the shaft balancer of the present invention attached to a rotating shaft.

The shaft balancer 10 of the present invention is illustrated in FIG. 1 secured to a rotating shaft 12 which is rotatably driven by any conventional means, such as a motor 14.

Figure 2:
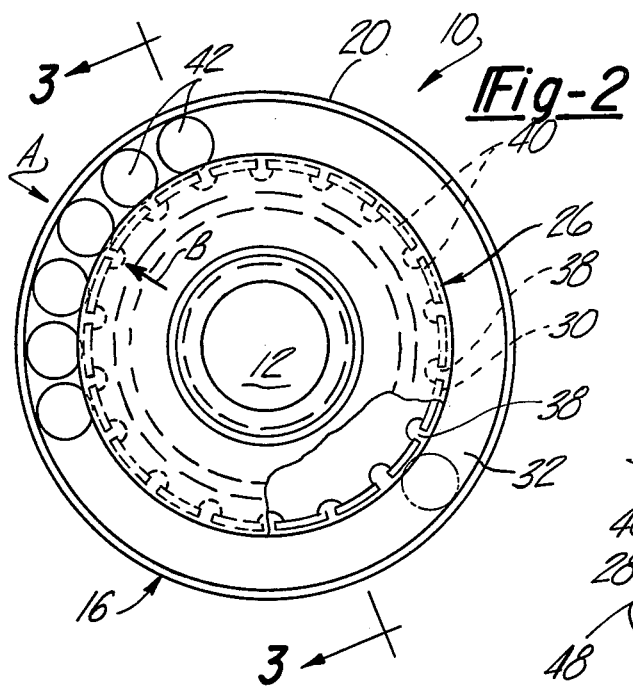
FIG. 2 is a top plan view showing the shaft balancer of the present invention with parts removed for clarity.
Figure 3:
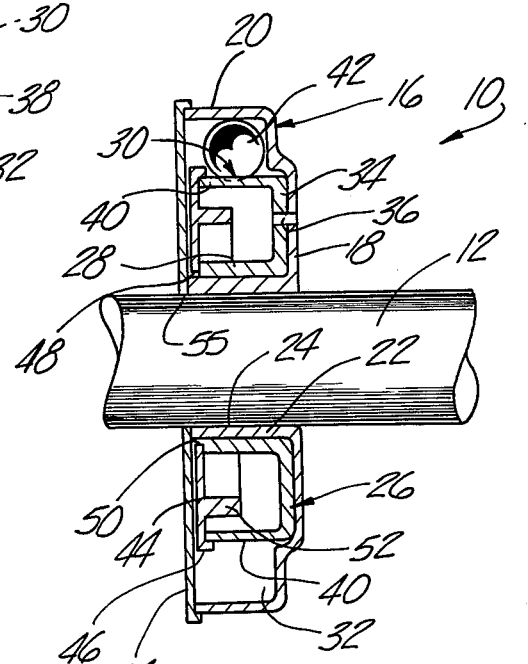
FIG. 3 is a cross-sectional view taken substantially along line 2-2 of FIG. 2.

Referring now particularly to FIGS. 2 and 3, the shaft balancer 10 comprises a housing 16 secured to the shaft 12 and having a radial base portion 18 (FIG. 3) and an outer rim 20 which is concentric with the shaft 12. In addition and as can best be seen in FIG. 3, for increased rigidity of the housing 16, the housing 16 preferably includes an inner rim portion 22 which is concentric with and abuts the shaft 12. Any conventional means, such as a Woodruff key or an Allen set screw (not shown) may be utilized to secure the housing 16 to the shaft 12.

Figure 5:
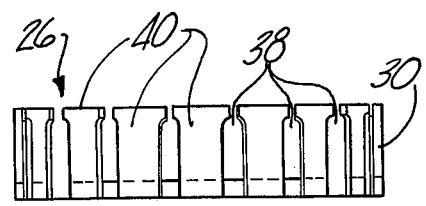
FIG. 5 is a side plan view showing the annulus for the shaft balancer of the present invention.

Referring now to FIGS. 2, 3, and 5, an annulus 26 constructed of a flexible material such as nylon is secured to and within the housing 16 in a manner to become shortly apparent. The annulus 26, as can best be seen in FIG. 3, includes an inner annular flange 28 and an outer rim 30 both of which are concentric with the shaft 12, and a radial base portion 34. The radial base portion 34 and the annular flange 28 of the annulus 26 flatly abut against and are secured to the housing base portion 18 and the housing inner rim 22, respectively, so that only the outer rim 30 of the annulus 26 is radially movable within the housing 16 as shown in phantom line in FIG. 4. Any conventional means, such as a pin 36 (FIG. 3) or a press fit, may be utilized to secure the annulus 26 to the housing 16.

Figure 4:
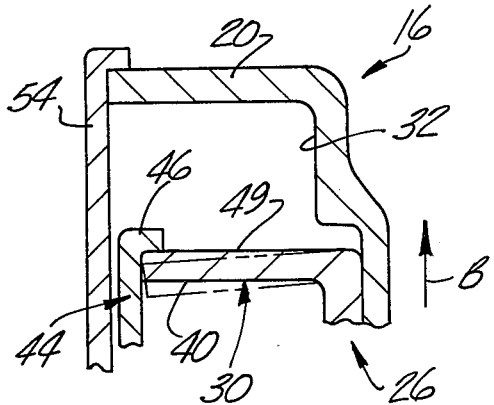
FIG. 4 is a partial cross-sectional view of the shaft balancer of the present invention and enlarged for clarity.

As best seen in FIGS. 2, 3 and 4, the outer rim 30 of the annulus 26 is spaced radially inward from the housing outer rim 20 thus forming an annular raceway 32. In addition, a plurality of equal distantly spaced axial slots 38 (FIG. 5) are formed around the annulus outer rim 30 which not only increases the flexibility of the rim 30, but also divides the outer rim 30 into a plurality of axial finger members 40. A number of ball members 42 are disposed within the raceway 32 and the ball members 42 are dimensioned so that a slight interference of between 0.005 and 0.020 inches exists between each finger member 40 and the ball members 42. While this interference between the finger members 40 and ball members 42 is preferably sufficient to retain the ball members 42 in their circumferential position in the raceway 32, in practice, it has been found that the ball members 42 typically migrate to a position between the slots 38 and the housing outer rim 20. Therefore, the slots 38 are preferably spaced around the annulus outer rim 30 at a circumferential distance equal to the diameter of each ball member 42.

Referring to FIGS. 3 and 4, a disc-shaped inertia ring 44 with an axial bore 48 is positioned over the shaft 12 and the open end of the annulus 26. A lip 46 around the outer periphery of the inertia ring 44 abuts against the outer surface 49 (FIG. 4) of the finger members 40. The axial bore 48 is of a greater diameter than the housing inner rim 22 so that a small clearance space 50 (FIG. 3) is provided between the bore 48 and the flange 22 to permit the inertia ring 44 to shift radially within the housing 16. Preferably the inertia ring 44 includes an annular flange 52 to increase the rotational mass and sensitivity of the inertia ring 44.

A circular cover 54 with an axial bore 55 is disposed over the housing 16 and is secured thereto by any conventional means. The cover 54 serves a two fold function. First, the cover 54 prevents dirt and debris from accummulating in the housing 16 and particularly around the raceway 32. Secondly, the cover 54 retains the inertia ring 44 within the housing 16 and prevents the possible expulsion of the ball members 42 from the housing 16.

The operation of the shaft balancer 10 of the present invention is as follows: Assume that the ball members 42 are initially in the position shown in FIG. 2 and also that this distribution of the ball members 42 creates a heavy imbalance in the circumferential position indicated by arrow A in FIG. 2. The inertia ring 44 can shift radially within the housing 16 within the limits defined by the clearance space 50 and due to the gyroscopic nature of the inertia ring 44 as it rotates, the inertia ring 44 will shift within the housing 16 to a position coaxial with the axis of rotation of the shaft 12. Consequently, with a heavy imbalance at the circumferential position A, the shaft 12 and housing 16 tend to shift radially outward in the direction of arrow B (FIG. 4) toward the circumferential position A. Simultaneously, the inertia ring 44 moves in the direction opposite to arrow B in order to maintain its position coaxial with the axis of rotation of the shaft 12. Movement of the inertia ring 44 (as illustrated in phantom line in FIG. 4) in the direction opposite that of arrow B retracts the finger members 40 away from the ball members 42 and releases the ball members 42. The ball members 42 reposition around the annular raceway 32 until the shaft imbalance is corrected, which typically requires less than one half of a second. When the balancer 10 achieves a balanced condition, the inertia ring rotates concentrically with the shaft 12 so that each ball member 42 is entrapped at its circumferential position in the raceway 32 between either a finger member 40 or a slot 38 and the outer rim 20 of the housing 16. In this manner, the balanced condition of the shaft 12 is maintained.

The shaft balancer 10 thus achieves advantages unknown to the previous shaft balancers. In particular, by securing the annulus 26 to the housing 16 and permitting only the outer rim 30 of the annulus to flex with the inertia ring 44, the shaft balancer 10 operates effectively at speeds up to and in excess of 10,000 rpm. Moreover, by eliminating the previously known elastomeric retainer band with the combination flexible annulus 26 and inertia ring 44, periodic replacement of the previously known retainer band is totally eliminated.

Having described my invention many modifications thereto will become apparent to those skilled in the art to which it pertains without deviation from the spirit of the invention as defined by the scope of the appended claims.

What is claimed is:

1. A device for automatically correcting an unbalanced condition in a rotating body and maintaining said body in a balanced condition comprising:
   a housing having a rim, means for securing said housing to said body so that said rim is concentric with the axis of rotation of said body,
   a one piece annulus constructed of a flexible material and having a base and an outer slotted rim,
   means for rigidly securing the base of said annulus to said housing so that the slotted rim of the annulus is concentric with and spaced radially inwardly from said housing rim thereby forming an annular raceway between said slotted rim and said housing rim,
   a floating inertia ring and means for securing said inertia ring across the open axial end of said slotted rim whereby said ring is adapted to flex the open axial end of said slotted rim between a radially retracted and radially extended position while the other axial end of said rim is radially stationarily secured to said housing by said base, and
   at least one ball disposed in said raceway wherein said ball is free to move circumferentially in said raceway with said ring in a retracted position and wherein said ball is locked by said slotted rim against circumferential movement in said raceway with said ring in an extended position.

2. The device as defined in claim 1, and including a circular cover secured over the housing outer rim.

3. The device as defined in claim 1, in which said housing includes a cylindrical inner rim which is secured to said rotating body and wherein said inertia ring has an axial bore formed therethrough of greater diameter than said housing inner rim so that a clearance cap is formed between said housing inner rim and said inertia ring axial bore.

4. The device as defined in claim 1, wherein said means for securing said inertia ring across the open end of said slotted rim comprises an annular lip formed around the outer periphery of said inertia ring and adapted to abut against the outside surface of said slotted rim.

5. The device as defined in claim 1, wherein said ball is dimensioned so that an interference of between 0.005 and 0.020 inches exists between said outer slotted rim and said ball when said inertia ring is concentric with said housing.

6. The device as defined in claim 4, wherein said inertia ring includes an annular flange for increasing the rotational mass and sensitivity of said inertia ring.

* * * * *

UNITED STATES PATENT AND TRADEMARK OFFICE
CERTIFICATE OF CORRECTION

PATENT NO. : 4,075,909
DATED : February 28, 1978
INVENTOR(S) : James E. Deakin

It is certified that error appears in the above-identified patent and that said Letters Patent are hereby corrected as shown below:

Claim 3, line 5, after "clearance" delete "cap" and insert --gap--.

Signed and Sealed this

Twenty-seventh Day of June 1978

[SEAL]

Attest:

RUTH C. MASON
Attesting Officer

DONALD W. BANNER
Commissioner of Patents and Trademarks